United States Patent Office 3,393,444
Patented July 23, 1968

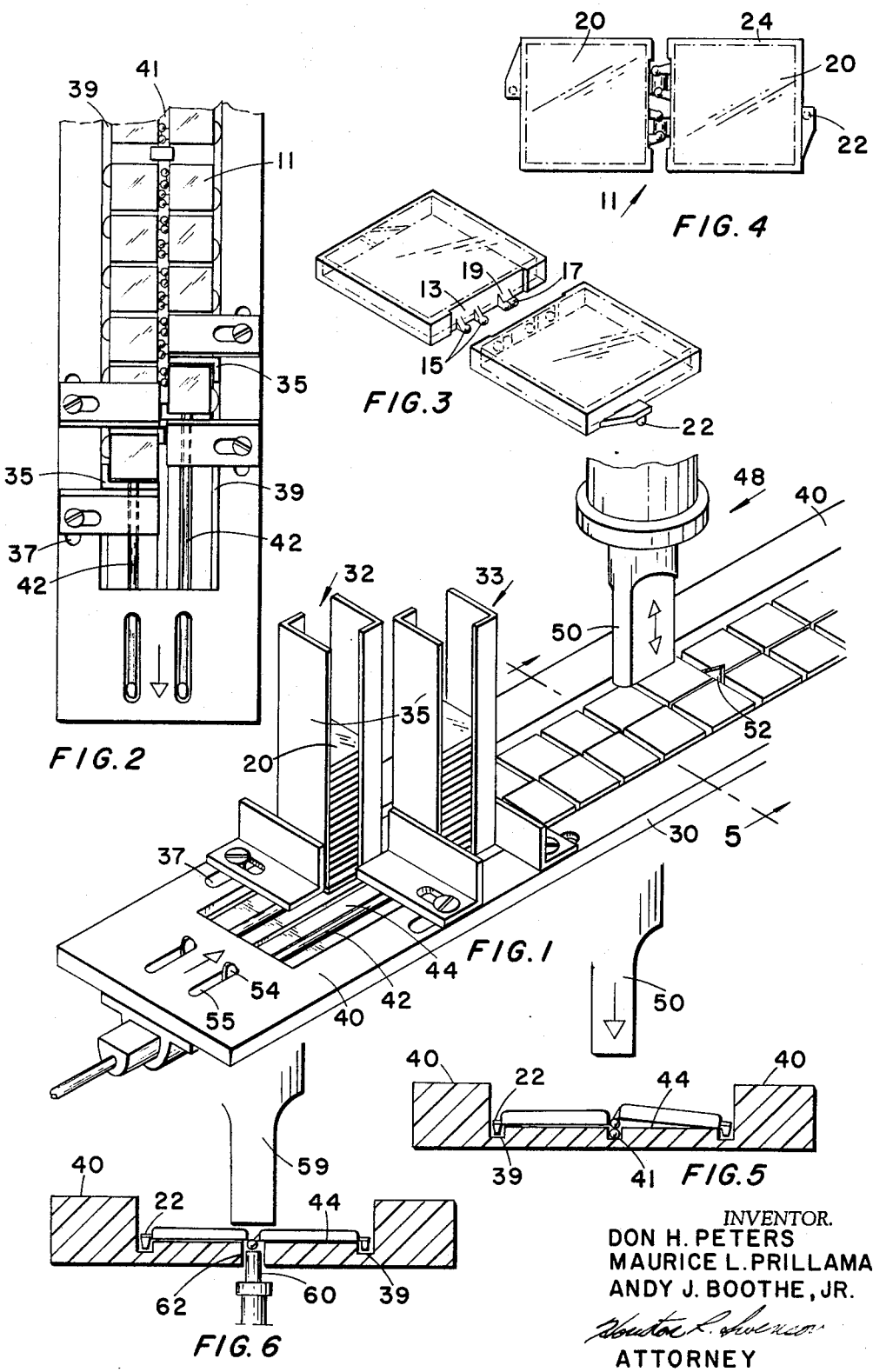

3,393,444
METHOD FOR ASSEMBLING PLASTIC BOXES
Don H. Peters, Maurice L. Prillaman, and Andy J. Boothe, Jr., Roanoke, Va., assignors to Creative Packaging, Incorporated
Filed Oct. 7, 1965, Ser. No. 493,618
6 Claims. (Cl. 29—442)

This invention relates to a method for assembling plastic boxes and, in particular, to a method whereby boxes of the conventional ball and socket hinge type are automatically joined.

There are a variety of plastic boxes, normally injection molded, which are formed in two sections. Each section carries a portion of a hinge. Usually boxes of this type are molded from a substantially rigid material such as polystyrene. The hinges for such plastic boxes generally comprise a ball and socket arrangement with the ball element formed on one box section and the socket element consisting of two members formed on the other section. While there are many types of ball and socket hinge designs, one of the more popular is that shown in U.S. Patent 2,570,341, G. H. Hake. In the hinged structure shown in the Hake patent a ball element formed on one edge of a box section is snapped into two spaced socket elements. In so doing, the socket elements are slightly displaced from their normal position until the ball is properly seated. Generally, a box will have two or more ball and socket hinges of this type.

In the past, ball and socket hinges have been joined by a manual operation. The most conventional way has been for a person to hold two sections in his hands and force one ball into its cooperating socket element and then force the second ball into its socket element. Although this operation, when performed by a skilled person, becomes relatively easy, there are, nevertheless, several disadvantages. The most obvious disadvantage is the need for a person to assemble the boxes, who would otherwise be free to engage in other duties. Furthermore, the force applied on the ball and socket elements by an individual will vary within certain limits. Likewise, the angle of the force applied on these hinge elements can vary when manually performed. Consequently, hinge elements will occasionally be broken or, even worse, be stressed to the point that they will break subsequent to shipment from the factory.

The method of this invention overcomes the above-mentioned disadvantages and, in addition, increases hourly output. In general, the method comprises the automatic transmittal of pairs of box sections to a ram-type apparatus with one box section having its hinge elements overlapping those of the other. A compressive force is applied by the ram apparatus on the pair of box sections closely adjacent to their hinge elements while the hinge elements of one section overlap the hinge elements of the other section. The force applied causes the ball and socket elements to be joined in a one-step, quick and efficient operation.

It is therefore one object of this invention to provide a more efficient means for assembling plastic box sections.

Another object of this invention is to provide a method for automatically assembling box sections having hinges of the ball and socket type.

Other objects and advantages of this invention will be apparent upon reading the following description in connection with the drawing in which:

FIG. 1 is a perspective view of the apparatus performing the novel method of automatic box assembly;

FIG. 2 is a partial top view in elevation of the apparatus of FIG. 1;

FIG. 3 is a perspective view of a box with the type of hinges to be joined by this method;

FIG. 4 is a perspective view of the box of FIG. 3 with the hinges joined;

FIG. 5 is a view in cross-section along lines 5—5 of FIG. 1 illustrating the position of the box hinges just prior to assembly; and FIG. 6 is a view in transverse cross-section of apparatus similar to that of FIG. 1 but embodying a modified means for applying compressive force on the box sections.

Referring to FIGS. 3 and 4, a conventional plastic box 11 formed from a rigid plastic material such as polystyrene is shown with a pair of ball and socket hinges. Each socket member 13 has two spaced lugs 15 designed for straddling a ball or cylindrical member 17. The two lugs 15 may be provided with gussets 19 for purposes of reinforcement inasmuch as the lugs are temporarily spread to receive a ball. It should be noted that while in the particular illustration each box section 20 is identical and has a ball member 17 and a socket member 13, this invention is also applicable to box sections having socket members on one section with a pair of ball members on the other section. A conventional knob 22 extends from an edge of each box section. These two knobs cooperate to latch the box sections when they are joined. A raised edge 24 may be formed about the outer edge of each box section to prevent scratching of the boxes when they are stacked.

Referring to FIGS. 1 and 2, apparatus is shown for performing the method of this invention. The apparatus includes a table 30 which may be supported in a conventional manner. Mounted on one end of the table are a pair of hoppers 32 and 33 with each hopper consisting of several upright angle bars 35 for containing a stack of box sections. The first hopper 32 is positioned along a path on the table with the second hopper being positioned in a more advanced point on a second path. The angle bars of the hoppers may be mounted in an adjustable fashion (slots 37) in order that they are able to contain boxes of varying sizes. Extending along the table's length and adjacent the outer edges of the two hoppers are recessed guide tracks 39 flanked by retaining walls 40. A middle recessed guide track 41 may be formed along the inner edges of the two hoppers. In order for the box sections to travel along the full length of the table, the table may be set on a slight incline. However, other means such as a belt conveyer can also be used for moving the box sections.

It will be noted that each of the hoppers is partially mounted over a stripper bar 42. The stripper bar extends along the full length of the hopper and rises above the general surface 44 of the table. The extent the stripper bar rises above the table's surface should be approximately equal to the depth of a box section. Likewise, each hopper 32 and 33 is spaced above the table's surface an amount just exceeding the depth of a box section.

On the downside path of the table a ram apparatus 48 is provided. This apparatus may be either pneumatically, hydraulically or mechanically operated for reciprocal action and is suspended over the table. A ram member 50 is fixed to the reciprocal apparatus. It may be desirable to provide a spring cushion connection (not shown) which will lessen the impact exerted by ram 50 on a box section. A reciprocal stop element 52 is positioned further down the path on the table in order to properly position a pair of box sections under the ram apparatus. This stop element extends above the surface of the table through guide track 41 during the joining of the hinge elements and then retracts to permit passing of the joined box sections into a hopper, not shown.

Each of the hoppers 32 and 33 contains a stack of box sections 20 with the hinges on each of the sections facing toward the center line and on rail 41 of the table. In the preferred method of this invention the boxes are inverted in order to permit the projecting hinge and latch elements to ride in rails 39 and 41. Normally, the box sections are prevented from being displaced from beneath their hoppers due to the stripper bars underneath them. Upon actuating the apparatus a stripper bar 42 is slidably withdrawn from beneath the hopper by conventional camming mechanism. The stripper bar's direction, which is parallel with guide rails 39, and its extent of travel are controlled by bar pin 54 which rides in elongated slot 55. On withdrawal of stripper bar 42 gravity permits the entire stack of box sections to descend toward the surface of the table. As the stripper bar is returned to its position beneath the hopper the lowermost box section is pushed along the path of the table and out from underneath hopper 32.

Removal of the lowermost box section from the second hopper 33 is achieved in a similar manner. Inasmuch as a box section from the first hopper 32 has been positioned adjacent the second hopper 33, it is apparent that the lowermost box section from the second hopper will overlap the first box section. The spacing of the guide rails 39 and 41 and the hoppers is such that the ball and socket hinge elements of the first box section are positioned directly beneath the inner edge of the second hopper. Therefore, the ball and socket elements of the second box section will drop precisely over their complementary socket and ball elements on the first box section.

The inverted pair of overlapping box sections continues its travel to a point directly beneath the ram element 50. The positioning of these overlapping box sections, as well as the preceding box sections which are being overlapped by the two hoppers, is controlled by the stop element 52. Thus, as illustrated, the stop element temporarily prevents further travel of the overlapping box sections under the ram element. Upon abutting against the stop element, the overlapping box sections underneath the ram 50 cause the actuation of a switch which in turn energizes the ram apparatus. Ram 50 is then forced downward against the top most overlapping box section along an edge 24. The raised edge 24 which serves to protect the overall surface of the box in stacking also protects the surface of the box section from being scratched by the ram element 50.

The compressive force applied to the edge of the overlapping box section may be a quick snap-action force. The result is the downward forcing of the hinge elements on the second box section into their seated positions with the hinge elements of the first box section. It is apparent that the extent of the downward movement of the ram must be controlled in order to prevent damaging the box sections. Resiliently mounting the ram 50 further protects the boxes from impact damage. As the hinge elements are joined together by the downward force there will be a tendency for the two box sections to resist the joining action and attempt to slide laterally away from each other. Referring to FIG. 5, the two outer guide rails 39, in addition to guiding the travel of the box sections provide a lateral restraining force to maintain the box sections in their overlapping position. Without such a lateral restraint it is possible that in certain sizes of boxes only one or none of the hinges will be joined.

As the ram element and cylinder are retracted to their upper position, the stop element 52 is energized by means of a solenoid, not shown, which then retracts beneath the surface of the table to permit gravity travel of the joined box sections into a hopper. Simultaneously with the travel of the joined box sections, successive pairs of boxes in their overlapping positions will be advanced toward the ram apparatus by the stripper bars 42. Meanwhile, another pair of box sections will be withdrawn from their hoppers by means of the stripper bars.

It is apparent that the above-described method enables a greater number of box sections to be connected in a more efficient manner. The force applied to the box sections needed to join their hinge elements can be accurately controlled, and applied perpendicularly to the planes of the box sections. Consequently, the hinge elements may be designed to receive a known amount of assembly force and therefore are not subjected to the variable stresses that might be incurred if assembled by a manual operation. The method of this invention causes the simultaneous assembly of the hinges on a pair of box sections. Prior manual techniques caused the assembly of one pair of hinge elements followed with the assembly of the second pair of hinge elements. This type of one-hinge-at-a-time joining method caused torque in the hinges which they were not designed to receive. The elimination of this torque action by the method of this invention increases the output rate of undamaged assembled boxes.

The illustrated apparatus is not confined to one size of box. Its hoppers are adjustable and will handle square and rectangular boxes having a wide range of depths. It is also not essential that the mating box sections be identical since one section may be relatively deep with a shallow cover. Consequently, ram apparatus 48 is also adjustable in order that the stroke of ram 50 can be varied.

FIG. 6 shows an alternative arrangement to provide the compressive force on the hinges. In this embodiment the reciprocal action in ram apparatus 48 is eliminated and replaced by anvil 59 which is vertically adjustable for near contact with the edge 20 of the overlapping box section. Anvil 59 cooperates with a reciprocating ram 60 positioned beneath an opening 62 in the table for contact with the hinge elements on the overlapped box section. Ram 60 may also be positioned for contact with an edge of the overlapped box section instead of the hinge elements. Ram 60 has a fixed stroke and is in a fixed mounting relative to the table, thereby reducing the possibility of adjustment and alignment problems. Whereas the apparatus first described requires adjusting a component that also is reciprocable, the use of anvil 59 requires merely adjusting a component with no reciprocable action. If the two box sections 20 are of different depths anvil 59 may be made into two adjustable components for individual contact with their respective box sections although contact with only the uppermost section will normally suffice.

It will be apparent to those skilled in the art that other variations can be made for performing the method of this invention without departing from the spirit of this invention and the scope of the appended claims.

We claim:

1. A method for simultaneously joining two pairs of hinge elements on first and second rigid box sections with the elements of each hinge consisting of a ball member on the edge of one box section and a pair of spaced lugs with gussets on the edge of the other box section, comprising the steps of: simultaneously positioning the hinge elements of said second box section over the hinge elements of said first box section with each of said two pairs of spaced lugs straddling and overlapping a respective ball member, and applying a compressive, quick snap-action force by ram apparatus closely adjacent to said hinge elements whereby they are forced and snapped into engagement with each other.

2. The method according to claim 1 in which the compressive quick snap-action force is applied downwardly on the ball member and spaced lugs of said second box section whereby they are forced and snapped into engagement with the ball member of said first box section.

3. The method according to claim 2 in which a lateral restraining force is maintained on the edges of said first and second box sections simultaneous to applying said compressive quick snap-action force.

4. The method according to claim 3 in which said first and second box sections are inverted with each of said two pairs of spaced lugs straddling a respective ball member.

5. The method according to claim 4 in which a supply of said first and second box sections to be joined are placed in first and second stacks offset and parallel to each other, the box sections in each stack being aligned in an inverted position with their hinge elements on a path leading between the two offset stacks, removing the bottom first box section and conveying it to the bottom second box section.

6. The method according to claim 5 in which said lateral restraining force is applied by maintaining a projecting latch element of each box section in a recessed rail during application of said compressive quick snap-action force.

References Cited

UNITED STATES PATENTS

| | | | |
|---|---|---|---|
| 2,570,341 | 10/1951 | Hake | 220—31 |
| 2,624,907 | 1/1953 | Graham | 29—453 X |
| 2,928,165 | 3/1960 | Carlzen et al. | 29—211 X |

THOMAS H. EAGER, *Primary Examiner.*